United States Patent [19]

Nakasuji et al.

[11] Patent Number: 5,058,036
[45] Date of Patent: Oct. 15, 1991

[54] DEVICE FOR SECRET REGISTRATION OF DISPLAY DATA

[75] Inventors: Masataka Nakasuji, Yamatokoriyama; Shigeru Shindoh, Nara, both of Japan

[73] Assignee: Sharp Kabyshiki Kaisha, Osaka, Japan

[21] Appl. No.: 301,642

[22] Filed: Jan. 25, 1989

[30] Foreign Application Priority Data

Jan. 30, 1988 [JP] Japan .............................. 63-11403[U]

[51] Int. Cl.⁵ .............................................. G06F 15/20
[52] U.S. Cl. ...................................... 364/518; 380/10; 364/900
[58] Field of Search ........ 364/518, 521, 900 MS File; 340/721, 723, 748-750, 798-800; 382/44-48; 380/4, 6, 9, 10, 20, 42

[56] References Cited

U.S. PATENT DOCUMENTS

| | | | |
|---|---|---|---|
| 4,400,794 | 8/1983 | Koos | 364/900 |
| 4,584,665 | 4/1986 | Vrielink | 364/900 |
| 4,677,552 | 6/1987 | Sibley, Jr. | 364/900 |
| 4,776,013 | 10/1988 | Kafri et al. | 380/10 X |

FOREIGN PATENT DOCUMENTS 286953 11/1988 Japan .

*Primary Examiner*—Heather R. Herndon
*Attorney, Agent, or Firm*—Cohen, Pontani & Lieberman

[57] ABSTRACT

A display data secret registration drive is adapted to add secret registration data to the data in a desired row or column of table data comprising rows and columns of data and stored in a memory. When the table data is to be shown on a display, the display presents the table data other than the row or column data having the secret registration data added thereto.

5 Claims, 7 Drawing Sheets

FIG. 5

⟨PRICE LIST 3⟩

TITLE: ELECTRONIC POCKET NOTEBOOK

| MODEL | PRICE1 | PRICE2 | PRICE3 | REMARKS |
|---|---|---|---|---|
| PA7000 | 19800 | 17800 | 15800 | NOTEBOOK |
| PA7C1 | 7000 | 6000 | 5000 | E-J, J-E |
| PA7C2 | 10000 | 8500 | 6000 | KANJI |
| PA7C3 | 7000 | 6000 | 5000 | 6 LANGUAGES |
| PA7C10 | 10000 | 8500 | 6000 | TELEPHONE |

FIG. 6(a)

⟨PRICE LIST 3⟩
ELECTRONIC
POCKET NOTEBOOK

FIG. 6(b)

⟨PRICE LIST 3⟩
TITLE ?

FIG. 6(c)

⟨PRICE LIST 3⟩
      PRICE1
PA7000 : 19800
PA7C1 : 7000
PA7C2 : 10000

FIG. 6(d)

PRICE3
PA7000 : 15800
PA7C1 : 5000
PA7C2 : 6000

DEVICE FOR SECRET REGISTRATION OF DISPLAY DATA

BACKGROUND OF THE INVENTION

1. Field of the Invention

The present invention relates to a device for the secret registration of display data primarily for use in electronic apparatus adapted to store or display table data.

2. Description of the Prior Art

Such electronic apparatus heretofore known for storing or displaying table data include those adapted for the secret registration of table data to make the data confidential (see, for example, Japanese Published Unexamined Pat. application No. SHO 63(1988)-286953).

For the secret registration of table data with such apparatus, the table data must invariably be made secret in its entirety, so that the secret registration needs to be cancelled, for example, every time a portion of the table is to be confirmed, hence adding substantial inconvenience.

The present invention, which has been accomplished in view of the above situation, provides a display data secret registration device adapted for the secret registration of only the desired item of table data.

SUMMARY OF THE INVENTION

The present invention provides a device for the secret registration of display data comprising key input means, memory means for storing table data composed of a plurality of data items and entered by the key input means, addition means for adding secret registration data to a portion of the table data in response to an instruction from the key input means, and discrimination means for discriminating said data portion having the secret registration data added thereto from the other portion of the table data stored in the memory means to show on the display means the table data other than the discriminated portion.

FIG. 1 shows the above component means as functionally associated with one another.

According to the invention, it is desired that the table data to be stored in the memory means be composed of a plurality of rows of data and a plurality of columns of data. In this case, the portion of the table data to which the secret registration data is added is the data in a desired row or column of the table data. Usually it is desirable that the data portion be the data in a desired row or column other than the first row or first column of the table data for listing the names of items.

With the display data secret registration device of the present invention thus constructed, secret registration data is added by the addition means to a portion of the table data stored in the memory means. When the display data is to be shown on the display means, the table data portion made secret is discriminated by the discrimination means to show the table data other than the discriminated portion. Accordingly, when there arises a need to recognize the table data, the data can be recognized without cancelling the secret registration if the data is other than the above-mentioned table data portion.

BRIEF DESCRIPTION OF THE DRAWINGS

FIG. 5 and FIGS. 6 (a) to 6 (d) are diagrams showing information on an LCD;

DESCRIPTION OF THE PREFERRED EMBODIMENTS

The term "table (or list) data" as used herein refers to tabulated data comprising row data and column data.

The display means of the invention may be one capable of displaying the table data, such as an LCD (liquid crystal display), CRT (cathode ray tube) display or EL (electroluminescence) display.

A microcomputer comprising a CPU (central processing unit), ROM (read only memory), RAM (random access memory) I/O (input/output) ports, etc. is usually used as the addition means and the discrimination means, and the RAM therein is generally used as the memory means.

The present invention will be described below in detail with reference to the illustrated embodiment, which nevertheless in no way limits the invention.

Figure 1:
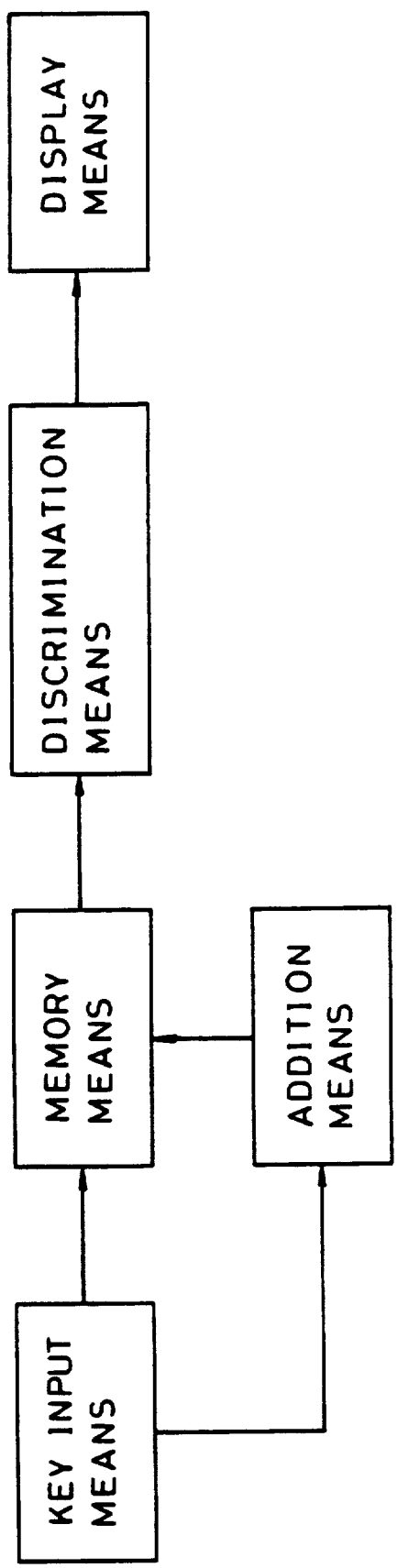
FIG. 1 is a block diagram showing the basic components of the device of the invention.
Figure 2:
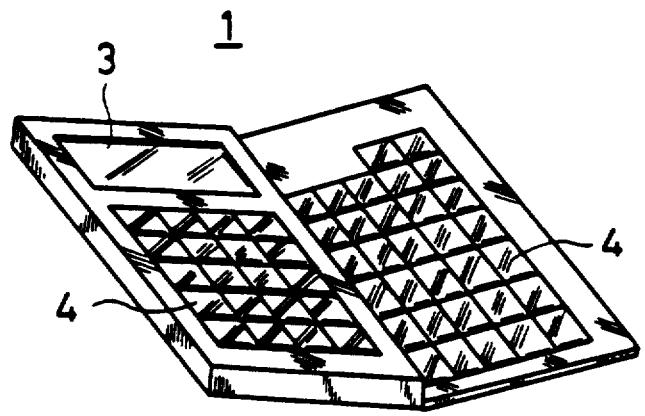
FIG. 2 is a perspective view showing the appearance of an electronic calculator embodying the invention.

FIG. 2 is a perspective view showing the appearance of an electronic calculator embodying the invention.

With reference to FIG. 2, indicated at 1 is the body of the electronic calculator which is termed an "electronic pocket notebook" adapted for storing telephone numbers, schedules, etc. The calculator body 1 further has the function of preparing various tables for sales management. Indicated at 3 is an LCD (liquid crystal display) for showing messages, calculation results and table data and also showing the results obtained by other management functions of the "electronic pocket notebook." The LCD of the present embodiment comprises a dot matrix. Input keys 4 are used for entering various items of data.

Figure 3:
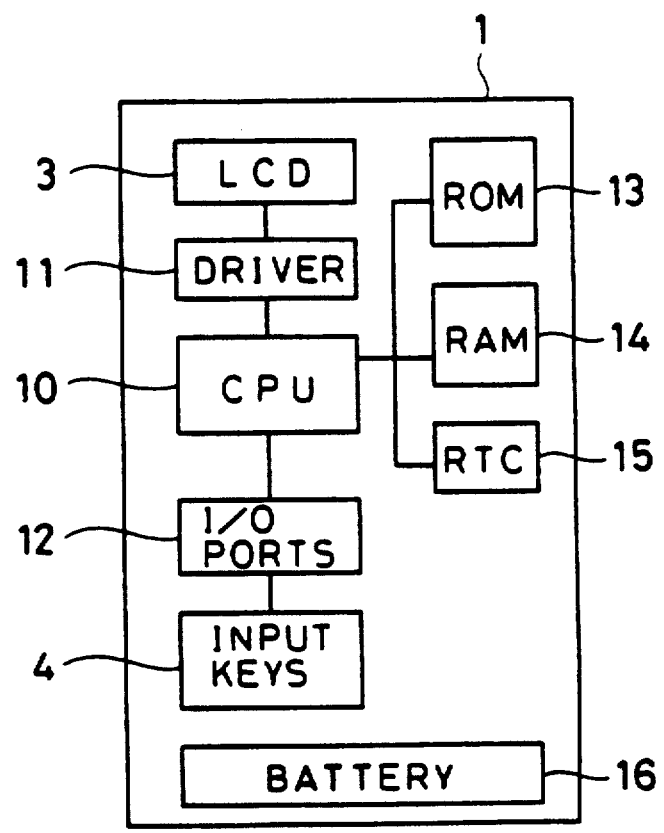
FIG. 3 is a block diagram showing the construction of the electronic calculator shown in FIG. 2.

FIG. 3 is a block diagram showing the construction of the calculator body 1 shown in FIG. 2.

Indicated at 10 in the drawing is a CPU for controlling the calculator 1 in its entirety, controlling the input-output operation thereof and performing calculations, and at 11 is a driver for driving the LCD 3. The LCD 3 is driven by the driver 11 in response to a control signal from the CPU 10 to display a calculation result, message, or table or the like.

The input data from input keys 4 is fed via I/O ports 12 to the CPU 10 for processing.

A ROM 13 has stored therein an operation control program for the CPU 10 and further has stored therein a control program for the input-output means of the calculator body 1. Indicated at 14 is a RAM for temporarily storing the data to be used for the operation control program in the ROM 13, at 15 an RTC (real time clock) for indicating the time, and at 16 a battery for supplying power to the calculator body 1.

Figure 4:
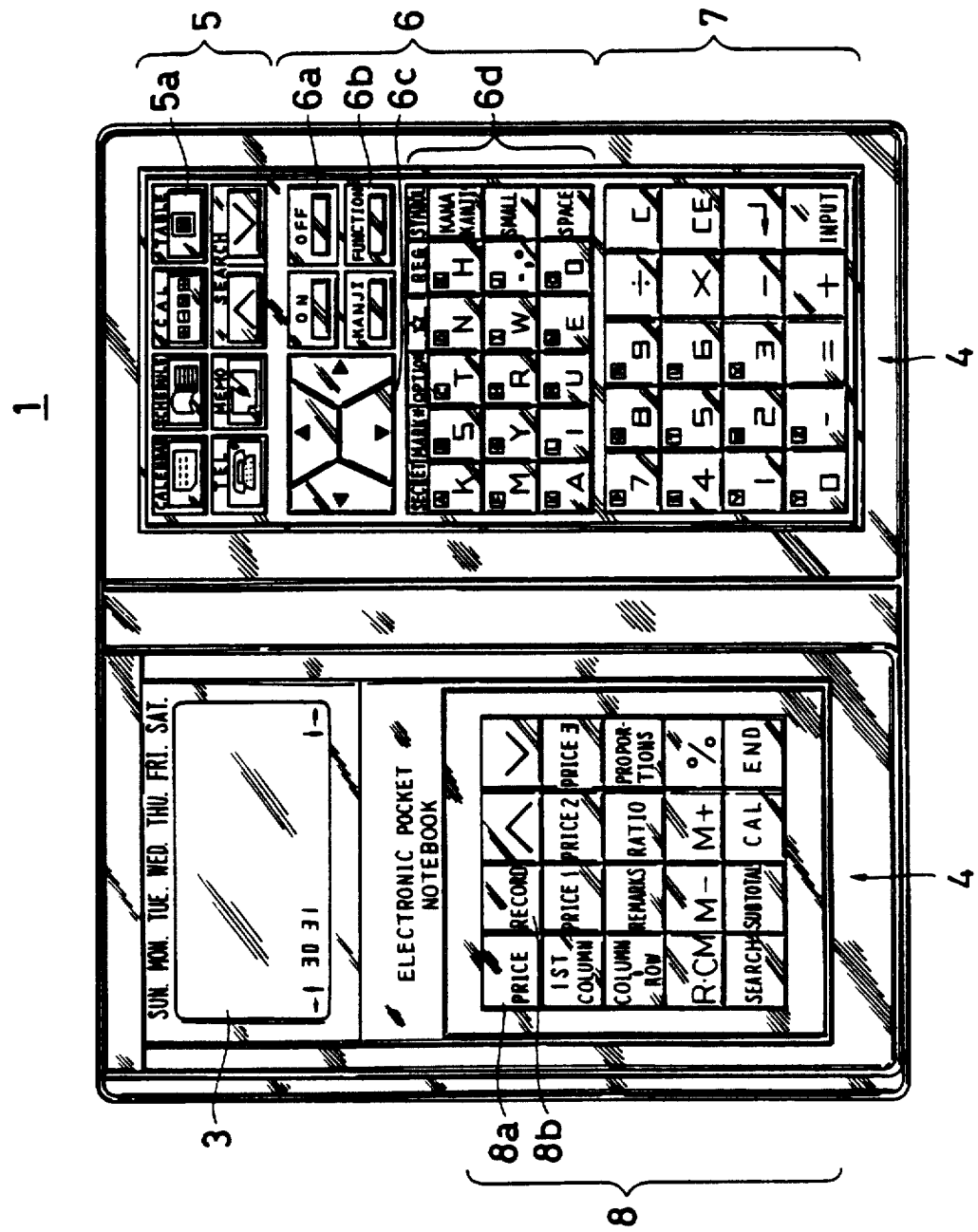
FIG. 4 is a diagram showing an input key arrangement.

FIG. 4 is a diagram showing the arrangement of input keys 4, and FIG. 5 and FIGS. 6 (a) to 6 (d) are diagrams showing information displays on the LCD 3.

With reference to FIG. 4, the input keys 4 include mode setting keys 5, operation keys 6, number entry keys 7, and sales management table keys 8 for inputting or outputting price tables and past record tables and performing calculations for these tables.

The mode setting keys 5 include keys for setting calendar, schedule, calculation, telephone and memorandum modes, and a table calculation key 5a for setting a table calculation mode. The operation keys 6 include ON and OFF keys 6a for turning on or off the power supply, function keys 6b for setting various functions, cursor keys 6c for moving a cursor, and alphabet input keys 6d for entering character information in the Roman alphabet.

The sales management keys 8 include a price list key 8a for specifying a particular price list, and a record table key 8b for specifying a particular past record table.

To prepare a sales management table, the ON key 6a is depressed to turn on the power supply, or the table calculation key 5a is depressed if the calculator is in some other mode. With the calculator set in the table calculation mode, the price list key 8a or the record table key 8b of the sales management table keys 8 is selected (the price list key 8a is selected in the present case). The title of the table to be prepared is entered using some of the alphabet input keys 6d and the number entry keys 7. Table data is then entered to obtain a table as seen in FIG. 5. The table is stored in the RAM 14.

To make secret the data in a column of the table thus prepared, the calculator is set in the table calculation mode, and information as seen in FIG. 6 (a) is shown on the screen of the LCD 3 to select the title and call up the input table data from the RAM 14.

The column to be subjected to secret registration (e.g. the third column in the present case) is then selected. The function key 6b and the "CORRECT" key portion of the cursor key 6c are depressed to set the calculator in a correction mode. Subsequently, the function key 6b and "MARK *" key among the alphabet input keys 6d are depressed to add secret registration data to the contemplated column data for the secret registration of the data.

The column data thus registered for secrecy is not displayed thereafter on the LCD 3. For example, when the information shown in FIG. 6 (b) is displayed on the LCD 3 to retrieve the table data from the RAM 14 by depressing "V" key among the sales management table keys 8 and present the data on the LCD 3, it may be attempted to show the data in the third column after displaying the data in the second column. However, the data in the fourth column is then displayed as seen in FIG. 6 (d), with the third column data excluded from the table data.

The operation of the present embodiment will be described below with reference to the flow charts of FIGS. 7 and 8 and to the operation block diagram of FIG. 9.

Figure 7:
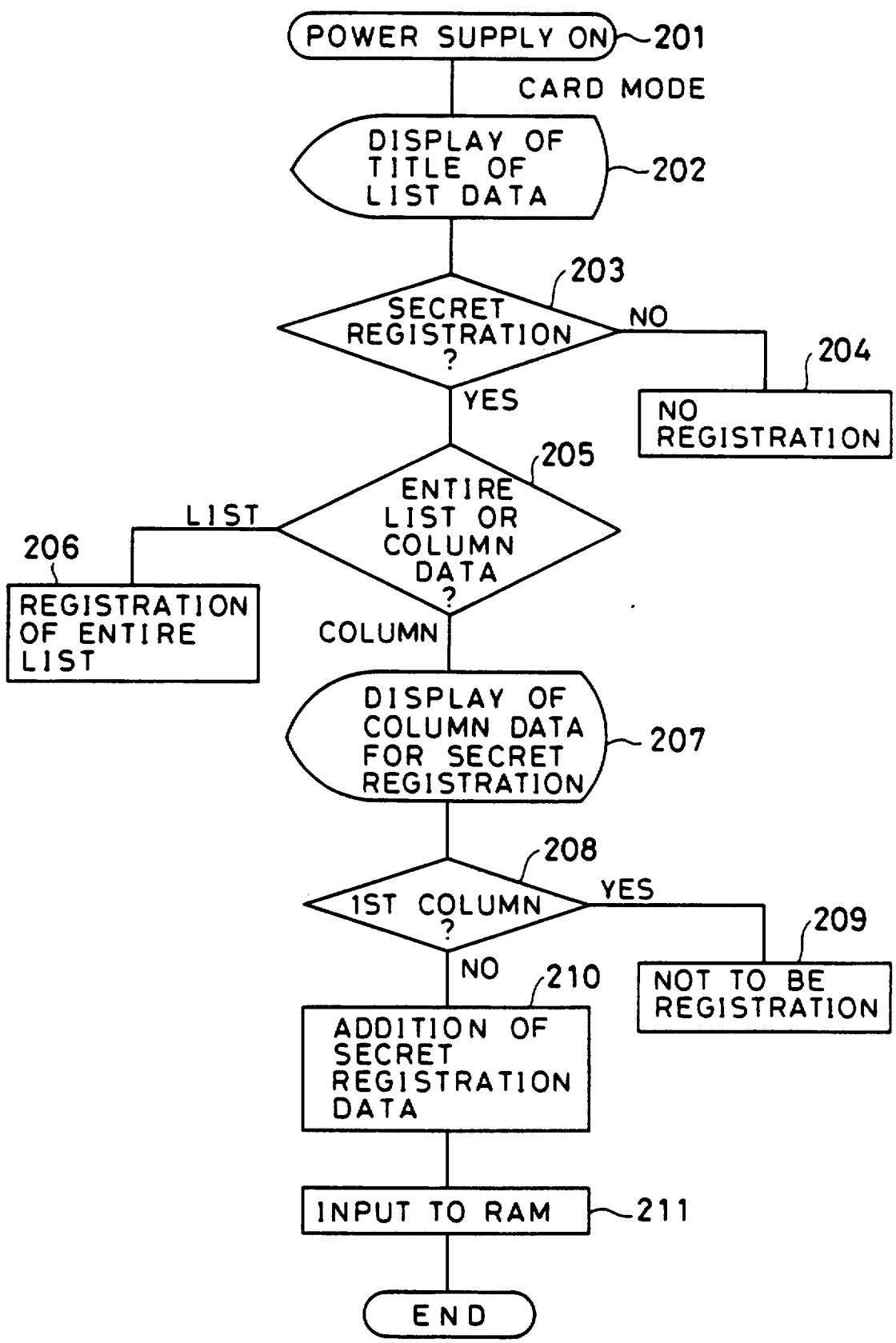
FIGS. 7 and 8 are flow charts showing the process to be executed by the herein disclosed embodiment for column secret registration.
Figure 9:
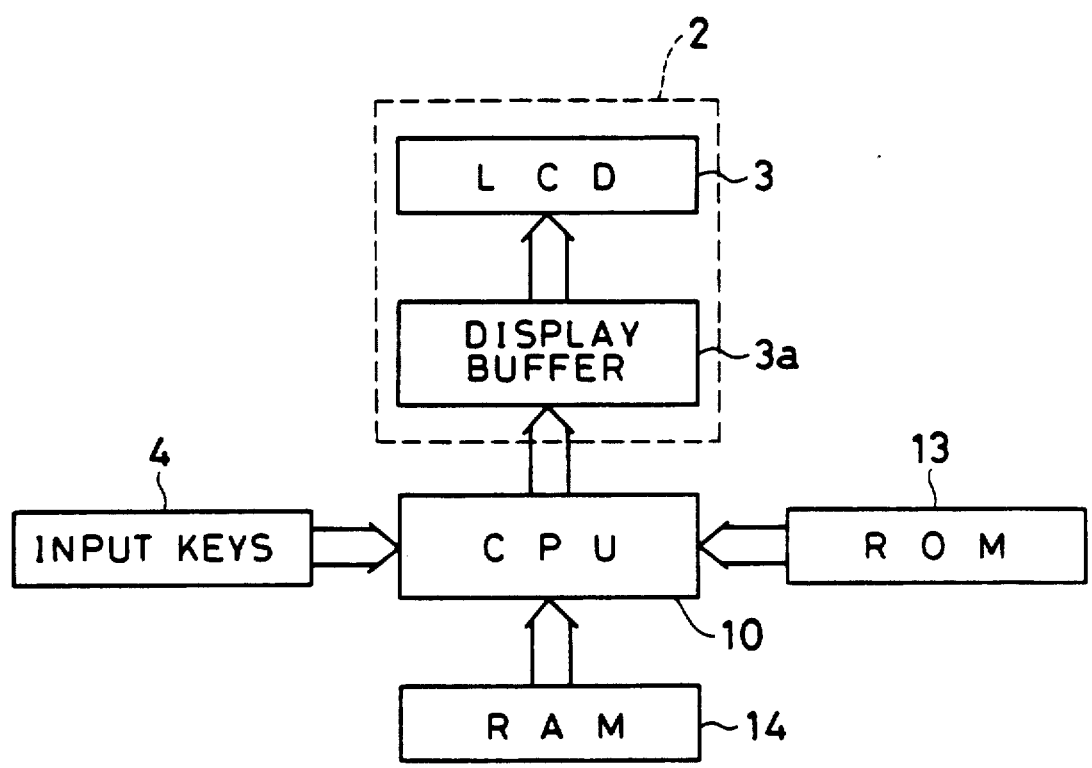
FIG. 9 is a block diagram showing the operation of this embodiment.

With reference to FIG. 7, it is assumed that table data has already been entered and stored in the RAM 14 shown in FIG. 9.

First, the ON key 6a is depressed to turn on the power supply of the calculator body 1 (step 201), whereby a prescribed program is loaded into the CPU 10, which executes the program to bring the calculator into operation.

Subsequently, the calculator is set in the table calculation mode, and one of the price list and past record table is selected. For example, the information shown in FIG. 6 (b) is displayed, and the title of the list is selected to display the information shown in FIG. 6 (a) (step 202).

Step 203 then inquires whether secret registration is to be made. If the answer is in the negative, the list is retrieved as it is (step 204). The listed data is arranged in a display buffer 3a shown in FIG. 9 and displayed on the LCD 3. FIG. 9 shows the LCD 3 and the display buffer 3a as assembled into a display device 2.

If the answer is in the affirmative, an inquiry is made as to whether the entire list or column data in the list is to be registered for secrecy (step 205). When the list is to be made secret in its entirety, the entire list is registered (step 206).

When column data is to be made secret, the list data is retrieved from the RAM 14 and displayed on the LCD screen from column to column (step 207).

The CPU 10 always checks whether the column data to be made secret is that in the first column. If the secret registration of the data in the first column is commanded, no registration is made since item names are listed in the first column (step 209).

When the secret registration of the data in a column other than the first column is commanded in step 208, secret registration data is added to that column by the CPU 10 (step 210), whereupon the list data is stored in the RAM 14 again. In this way, a list or table is completed with the specified column data made secret.

Figure 8:
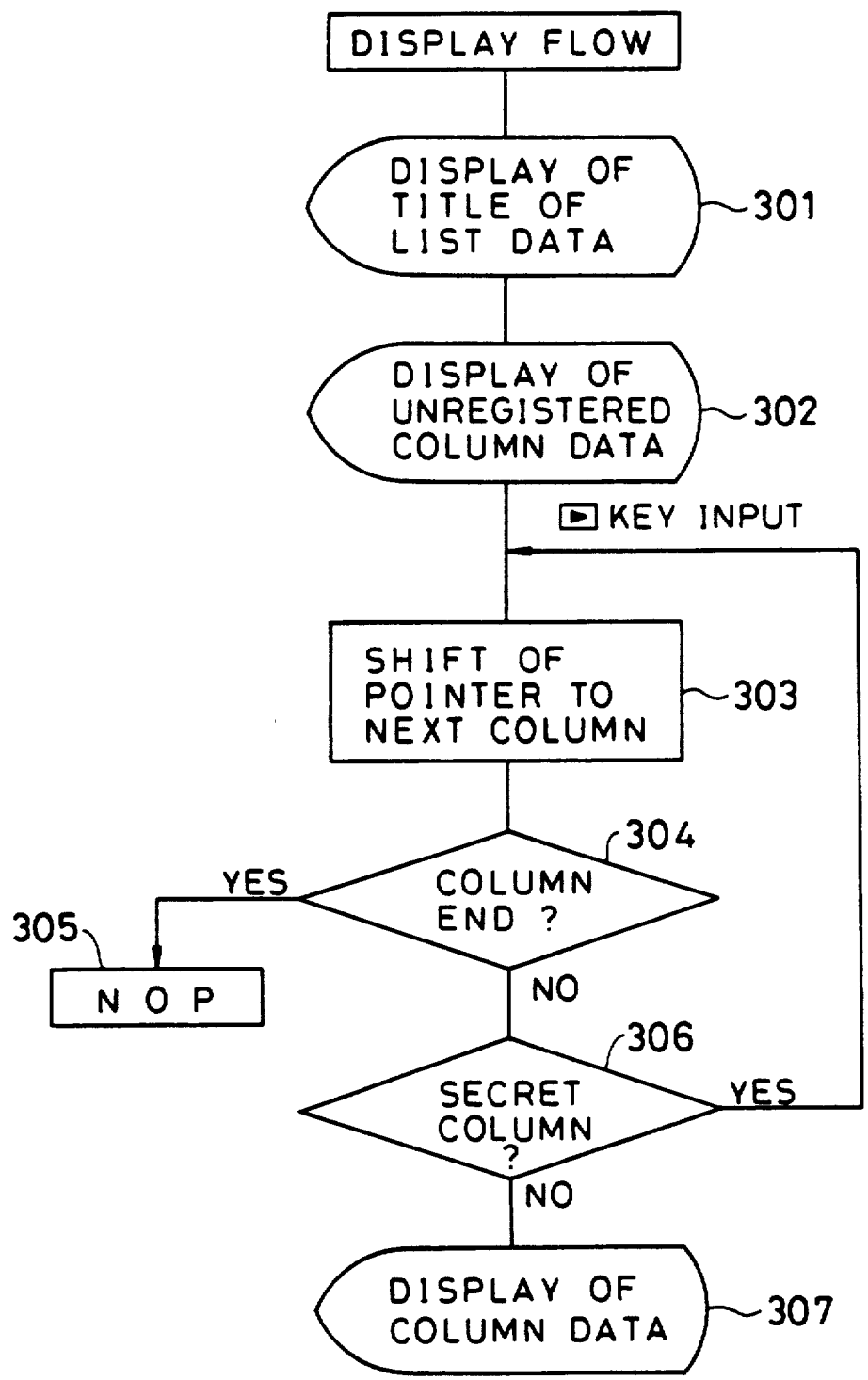

The list data is called up from the memory by the procedure shown in FIG. 8. The title of the list data is displayed as seen in FIG. 6 (a) (step 301), and the list data is retrieved from the RAM 14 and displayed on the LCD screen from column to column as seen in FIG. 6 (c) (step 302).

When the display pointer is shifted to the next column (step 303), the CPU 10 checks whether all the columns have been completed (step 304). If the columns have been completed, the pointer remains unshifted (step 305).

If some columns still remain to be retrieved, step 306 inquires whether secret registration data is added to the next column. If the answer is affirmative, the data in that column is not shown, the following column is shown as seen in FIG. 6 (d). If the answer is negative, the column data concerned is displayed (step 307). In this case, the column data can be called up by specifying the column. When a direct instruction is given to display the column having the secret registration data added thereto, the CPU 10 transfers the message "CANCEL SECRET ON" from the ROM 13 to the LCD 3 to show the message on the screen.

Although the present embodiment has been described with reference to a case wherein column data in a table is registered for secrecy, row data can of course be registered similarly in the same manner as the column data.

The device of the present invention for the secret registration of table data is so adapted that the desired portion only of the table data can be registered for secrecy. When required, therefore, the table data other than the registered portion can be recognized without cancelling the secret registration.

What is claimed is:

1. A device including a display for the secret registration of display data, comprising:
   key input means operable for entering data;
   memory means for storing data entered by said key input means, said data comprising a plurality of data items arranged in row and column format as a plurality of rows of data and a plurality of columns of data thereby defining table data;

addition means for adding secret registration data to a portion of the table data less than the whole of said table data is response to an instruction from said key input means; and discrimination means for discriminating said data portion having the secret registration data added thereto from other portions of the table data stored in said memory means and not having the secret registration data added thereto to show on the display only said other portions of the table data not having the secret registration data added thereto.

2. A device as defined in claim 1 wherein said data portion to be discriminated comprises data in a desired row of the table data.

3. A device as defined in claim 1 wherein said data portion to be discriminated comprises data in a desired column of the table data.

4. A device as defined in claim 1 wherein said data portion to be discriminated comprises data in a desired row other than the first row of the table data.

5. A device as defined in claim 1 wherein said data portion to be discriminated comprises data in a desired column other than the first column of the table data.

* * * * *